United States Patent
Leung et al.

(10) Patent No.: US 7,051,264 B2
(45) Date of Patent: May 23, 2006

(54) ERROR CORRECTING MEMORY AND METHOD OF OPERATING SAME

(75) Inventors: Wingyu Leung, Cupertino, CA (US); Fu-Chieh Hsu, Saratoga, CA (US)

(73) Assignee: Monolithic System Technology, Inc., Sunnyvale, CA (US)

(*) Notice: Subject to any disclaimer, the term of this patent is extended or adjusted under 35 U.S.C. 154(b) by 428 days.

(21) Appl. No.: 10/003,602

(22) Filed: Nov. 14, 2001

(65) Prior Publication Data

US 2003/0093744 A1    May 15, 2003

(51) Int. Cl.
*H03M 13/00* (2006.01)
*G11C 29/00* (2006.01)

(52) U.S. Cl. .................................... 714/763
(58) Field of Classification Search ............. 714/752, 714/754, 758, 763, 764, 798, 799, 800, 718, 714/733, 734, 819; 365/200, 201; 711/106, 711/143, 118, 105
See application file for complete search history.

(56) References Cited

U.S. PATENT DOCUMENTS

| | | | |
|---|---|---|---|
| 4,317,201 A * | 2/1982 | Sedalis | 714/766 |
| 4,345,328 A * | 8/1982 | White | 714/758 |
| 4,380,812 A | 4/1983 | Ziegler, II et al. | |
| 4,694,454 A | 9/1987 | Matsuura | |
| 5,003,542 A | 3/1991 | Mashiko et al. | |
| 5,233,616 A * | 8/1993 | Callander | 714/758 |
| 5,524,220 A | 6/1996 | Verma et al. | |
| 5,638,385 A | 6/1997 | Fifield et al. | |
| 6,065,146 A | 5/2000 | Bosshart | |
| 6,101,614 A * | 8/2000 | Gonzales et al. | 714/6 |
| 6,147,535 A | 11/2000 | Leung | |
| 6,374,381 B1 * | 4/2002 | Moriya | 714/746 |

FOREIGN PATENT DOCUMENTS

| | | |
|---|---|---|
| GB | 2289779 | 11/1995 |
| JP | 55055499 | 4/1980 |

OTHER PUBLICATIONS

"Error detection and correction with the IDT49C466" by Anupama Hegde, Dec. 18, 1994, No. 10, pp. 613-620.

(Continued)

*Primary Examiner*—Christine T. Tu
(74) *Attorney, Agent, or Firm*—Bever, Hoffman & Harms, LLP; E. Eric Hoffman

(57) ABSTRACT

A memory device that uses error correction code (ECC) circuitry to improve the reliability of the memory device in view of single-bit errors caused by hard failure or soft error. A write buffer is used to post write data, so that ECC generation and memory write array operation can be carried out in parallel. As a result there is no penalty in write latency or memory cycle time due to ECC generation. A write-back buffer is used to post corrected ECC words during read operations, so that write-back of corrected ECC words does not need to take place during the same cycle that data is read. Instead, write-back operations are performed during idle cycles when no external memory access is requested, such that the write back operation does not impose a penalty on memory cycle time or affect memory access latency.

19 Claims, 6 Drawing Sheets

OTHER PUBLICATIONS

"Error Correction Circuitry for Dynamic Random Access Memories", IBM Technical Disclosure Bulletin, vol. 36, No. 08, Aug. 1993, pp. 681-682.

"16-Bit CMOS Error Detection And Correction Unit", ©1990 Integrated Device Technology, Inc., pp. 1-19.

"Cost Analysis of On Chip Error Control Coding for Fault Tolerant Dynamic RAMs", by Najmi Jarwala and Dhiraj K. Pradham, 1987 IEEE, pp. 278-283.

"A Class of Optimal Minimum Odd-weight-column SEC-DED Codes" by M.Y. Hsiao, Jul. 1970, pp. 395-401.

* cited by examiner

ERROR CORRECTING MEMORY AND METHOD OF OPERATING SAME

FIELD OF THE INVENTION

The present invention relates to semiconductor memory systems, such as static random access memory (SRAM) systems or dynamic random access memory (DRAM) systems. More specifically, the present invention relates to a memory system including an error detection and correction system.

DISCUSSION OF RELATED ART

Semiconductors memories such as DRAM and SRAM devices are susceptible to both soft and hard errors. Soft errors are generated when sub-atomic energetic particles hit the memory device and generate charge high enough to upset the state of one or more memory cells. Hard errors are generated by defects in the semiconductor device during the manufacturing process. The incorporation of error detection and correction circuitry in memory devices has been described in many prior art schemes.

For example, U.S. Pat. No. 5,638,385, entitled "Fast Check Bit Write For A Semiconductor Memory" by John A. Fifield et al., describes the use of error-correction codes (ECC), such as error-correction check bits, in a memory using two different types of memory cells. Smaller and slower memory cells are used to store data bits, while larger and faster memory cells are for storing error-correction check bits. The faster cells provide faster write access to the error-correction check bits, thereby compensating for the delay associated with the generation of the error-correction check bits, and minimizing the impact of the ECC generation on the overall memory write latency. This, however, is accomplished at the cost of larger area.

U.S. Pat. No. 6,065,146, entitled "Error Correcting Memory" by Patrick Bosshart, describes an error-correcting memory that imposes no penalty on memory access latency or operating frequency. This error-correcting memory performs error correction only during a refresh operation of the memory, during a second or subsequent read operation of a burst read sequence, or during a write-back operation. As a result, the error correction scheme does not increase the read latency of the memory. Similarly, error correction check bits are only generated during refresh operations of the memory. As a result, the generation of error correction check bits does not increase the write latency of the memory. However, this error correction scheme cannot correct data errors occurring in the first read operation of a burst read sequence, or in data written to the memory before the error correction check bits are generated.

U.S. Pat. No. 5,003,542, entitled "Semiconductor Memory Device Having Error Correcting Circuit and Method For Correcting Error", by Koichiro Mashiko, et al., describes a memory that includes ECC circuitry incorporated in the sense amplifier area of the memory. More specifically, a second set of sense amplifiers and ECC correction logic is coupled to the bit lines of the memory array, thereby speeding up the error correction process by eliminating delays through the input/output (I/O) circuitry. However, this scheme requires that a second set of sense amplifiers and ECC correction logic be incorporated in each memory array. In general, there are many memory arrays in a memory device. As a result, this arrangement increases the array area and thus the silicon area of the memory. In addition, even though delays through the I/O circuit are eliminated, the delays through the ECC correction circuit still increase the memory cycle time. For a high-frequency memory, this increase is significant.

It would therefore be desirable to have an improved error detection and correction scheme that overcomes the above-described deficiencies of the prior art.

SUMMARY

Accordingly, the present invention provides a memory device or an embedded memory block that includes an array of memory cells with built-in ECC protection. In one embodiment, the memory cells are DRAM cells. In another embodiment, the memory cells are SRAM cells. The error-correction code function is designed so that the error-correction code generation does not increase the write access time of the memory device. The scheme also provides for write-back of corrected data without decreasing the operating frequency of the memory device.

To eliminate the effect of ECC generation on the write access time, a write buffer is used to facilitate a posted write scheme. During a first write access, a first write data value and the corresponding first write address are stored in a first entry of the write buffer. At this time, an error correction circuit generates a first error correction code in response to the first write data value. During a second write access, the first write data value and the first error correction code are transferred to a second entry of the write buffer and retired to the memory array. At the same time, a second write data value and a corresponding second write address are stored in the first entry of the write buffer. After the second write data value is stored in the first entry of the write buffer, the error correction circuit generates a second error correction code in response to the second write data value. The second write data value, second write address and second error correction code are stored in the write buffer until the next write operation. Because the error correction code is generated in parallel with the retiring of a previous write data value, and because the error correction circuit and write buffer operate faster than the memory array, the error correction code generation does not impose a penalty on the memory cycle time or the write access time.

Error detection and correction is also performed on data values read from the memory device. During a read access, a read data value and the corresponding ECC word are read from the memory array and provided to an error detection-correction circuit. The error detection-correction circuit provides a corrected read data value that is driven to the output of the memory device. The error detection-correction circuit also provides a corrected ECC word, and an error indicator signal, which indicates whether the read data value or corresponding ECC word included an error. In one embodiment, the error indicator signal indicates whether the read data value or corresponding ECC word included a single error bit. If the error indicator signal is activated, the corrected read data value and corrected ECC word are posted in the write-back buffer at the same time that the corrected read data value is driven to the output of the memory device. The corrected read data value and ECC word in the write-back buffer are retired to the memory array during an idle cycle of the memory array, during which no external access is performed. By retiring the corrected read data value and ECC word during an idle cycle, the write-back scheme does not have an adverse affect on the memory cycle time.

The number of entries in the write-back buffer is limited. Therefore the entries of the write-back buffer can be exhausted during a period of many consecutive read accesses that have correctable errors. In this case, an allocation policy can be executed to either drop the earliest entry in the write-back buffer (FIFO policy) or stop accepting entries in the write-back buffer (LIFO policy). The chance of having to invoke the allocation policy is small, because the number of words containing errors in the memory at a given time is small. The chance of reading all of these error words without a sufficient number of idle cycles in between is even smaller. Moreover, the allocation policy does not stop the memory device from functioning correctly, because a read data value/ECC word that contains an error, but cannot be posted in the write-back buffer, can still be accessed from the memory array, corrected by the error detection-correction circuit, and then driven to the memory output, as long as the data value/ECC word does not accumulate more error bits than the error correction circuit can correct. The write-back buffering decouples the memory array operation from the error correction operation, because the memory array does not need to wait for the corrected data before completing the access cycle. Therefore, the memory cycle time is not affected by the write-back operation. The read latency, however, is increased, because the data needs to propagate through the error detection correction unit before being driven to the output of the memory.

The present invention will be more fully understood in view of the following description and drawings.

DETAILED DESCRIPTION

Figure 1:
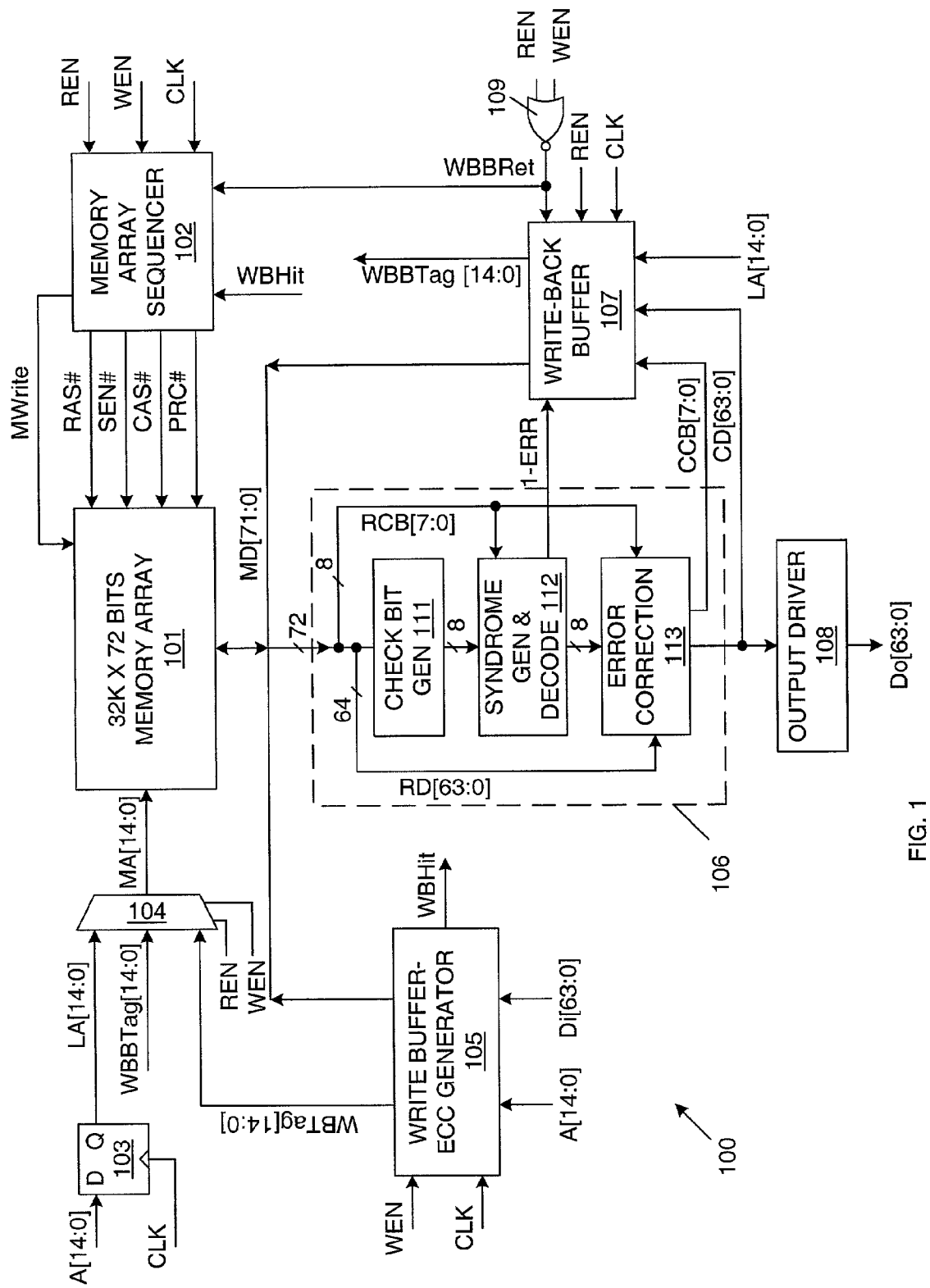
FIG. 1 is a block diagram of a memory device in accordance with one embodiment of the present invention.

FIG. 1 is a block diagram of a memory device 100 in accordance with one embodiment of the present invention. Memory device 100 includes memory array 101, memory array sequencer 102, address register 103, multiplexer 104, write buffer/ECC generator 105, error detection/correction circuit 106, write-back buffer 107, output driver 108 and NOR gate 109. The external interface of memory device 100 includes a 64-bit input data bus Di[63:0], a 64-bit output data bus Do[63:0], a read enable line REN, a write enable line WEN, a clock line CLK, and a 15-bit address bus A[14:0]. In the described embodiments, each bus/line and the corresponding signal are identified using the same reference element. For example, Di[63:0] is used to identify both the input data bus and the input data value transmitted on the input data bus.

In the described example, memory array 101 is a conventional 32k×72-bit memory array, although this is not necessary. In the described embodiment, memory array 101 includes a plurality of sub-arrays. Each sub-array includes word line drivers for the activation of a selected word line, and sense-amplifiers for the amplification of signals from the selected memory cells. Memory array 101 also contains address decoders for accessing the memory cells selected by the memory address MA[14:0] provided by multiplexer 104. Memory array 101 includes circuitry that is well known to those of ordinary skill in the art of memory design.

Memory array 101 uses DRAM cells in the described embodiment, although SRAM cells can be used in an alternate embodiment. The refresh of the DRAM cells is managed by circuitry outside of memory device 100 by performing periodic read accesses on all of the word lines of memory array 101. Additional logic can also be easily incorporated to adapt to the refresh scheme described in commonly-owned U.S. Pat. No. 6,028,804, "Method and Apparatus For 1-T SRAM Compatible Memory". The operation of memory array 101 is controlled by memory array sequencer 102, which generates a row access select signal RAS#, a sense amplifier enable signal SEN#, a column address select signal CAS# and a pre-charge signal PRC#. The functionality of these control signals and the operation of memory array sequencer 102 are described in more detail in commonly owned U.S. Pat. No. 6,147,535, entitled "Clock Phase Generator For Controlling Operation of a DRAM Array". In the described embodiment, memory array sequencer 102 sequentially asserts the RAS#, SEN#, CAS# and PRC# signals in a predetermined manner to enable a memory access to be completed during a single clock cycle.

Address multiplexer 104 routes an input address MA[14:0] to memory array 101 from one of three different sources. One source is a latched address signal LA[14:0], which is driven by the output of address register 103. Another source is the write buffer tag address WBTag[14:0], which is driven by the address field of write buffer/ECC generator 105. The third source is the write-back buffer tag address WBBTag[14:0], which is driven by the address field of write-back buffer 107. Address multiplexer 104 is controlled by the read enable signal REN and the write enable signal WEN. As described in more detail below, multiplexer 104 passes the latched address signal LA[14:0] during a read operation, when the read enable signal REN is asserted and the write enable signal WEN is de-asserted. Multiplexer 104 passes the write buffer tag address WBTag[14:0] during a write operation, when the write enable signal WEN is asserted and the read enable signal REN is de-asserted. Finally, multiplexer 104 passes the write-back buffer tag address WBBTag[14:0] during a write-back operation, when both the write enable signal WEN and the read enable signal REN are de-asserted.

Data input to memory array 101 and data output from memory array 101 is transmitted as a 72-bit memory data word MD[71:0] on a 72-bit data bus. The 72-bit data word MD[71:0] includes two fields: a 64-bit data field and a 8-bit error correction code (ECC) field. At the beginning of a memory cycle (as indicated by the falling edge of the RAS# signal), the 72-bit memory data word MD[71:0] is latched into a data register (not shown) in memory array 101.

Figure 2:
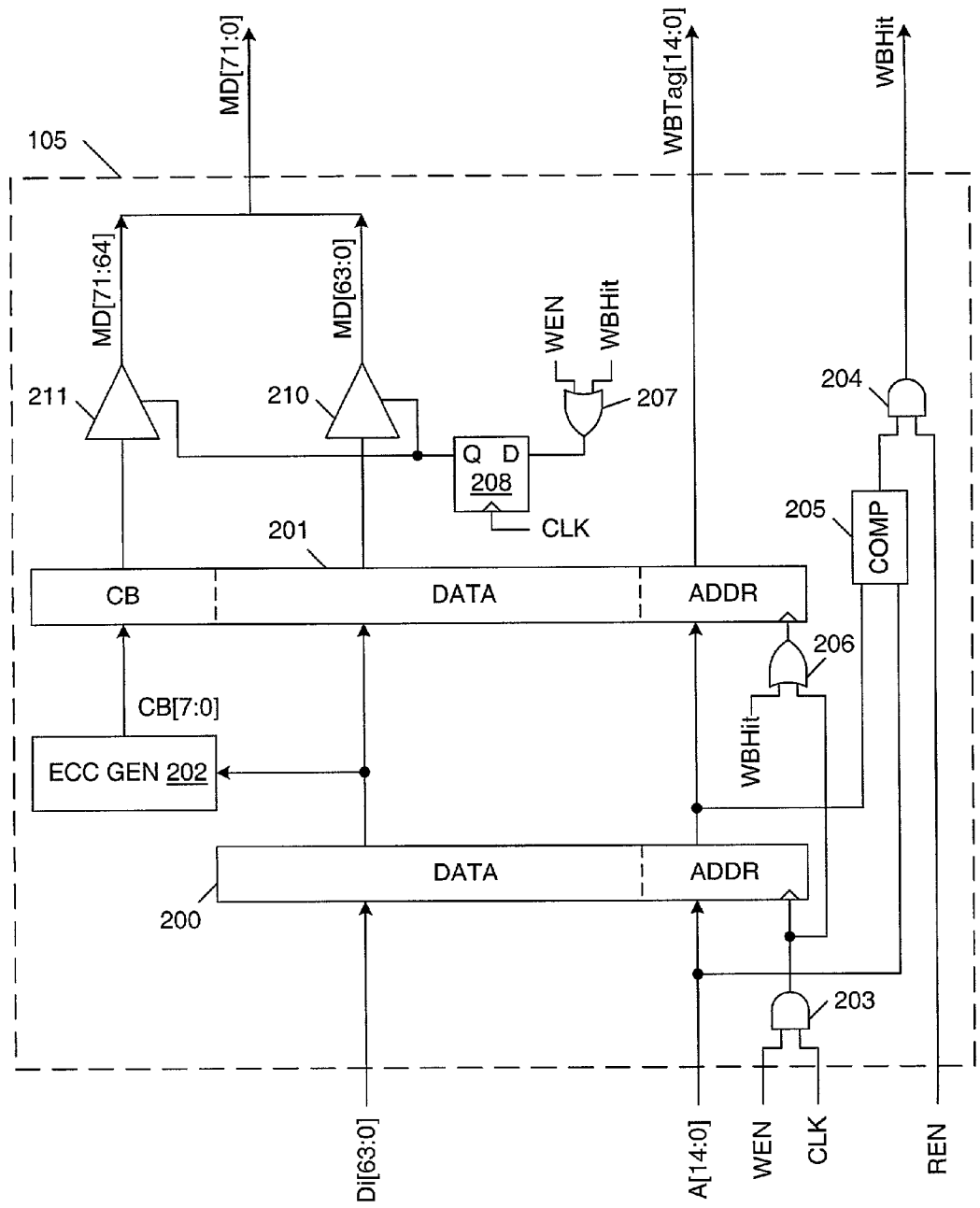
FIG. 2 is a block diagram of a write buffer-error correction code (ECC) generator in accordance with one embodiment of the present invention.

FIG. 2 is a block diagram of write buffer/ECC generator 105 in accordance with one embodiment of the present invention. In the described embodiment, write buffer/ECC generator 105 includes input register 200, output register 201, error correction code (ECC) generator 202, AND gates 203–204, comparator 205, OR gates 206–207, D type flip-flop 208, and tri-state output buffers 210–211. Write buffer/ECC generator 105 includes registers 200 and 201. Registers 200–201 are configured into a first-in, first-out (FIFO) configuration. Input register 200 contains 79-bits for storing one address entry (15-bits) and one data entry (64-bits). Output register 201 contains 87-bits for storing one address entry (15-bits), one data entry (64-bits), and the associated error correction code (8-bits) generated by ECC generator 202.

Write buffer/ECC generator 105 operates as follows. At the beginning of a first memory write access, a first write data value $Di_1[63:0]$ and a corresponding first write address $Ai_1[14:0]$ are applied to input register 200, and the write enable signal WEN is asserted high. The clock signal CLK subsequently transitions to a logic high state, thereby causing AND gate 203 to provide a logic high signal to enable input register 200. In response, input register 200 latches the first write data value $Di_1[63:0]$ and the corresponding first write address $Ai_1[14:0]$. The first write data value $Di_1[63:0]$ is applied to ECC generator 202. In response, ECC generator 202 generates a first error correction check bit signal $CB_1[7:0]$.

At the beginning of a second (subsequent) memory write access, a second write data value $Di_2[63:0]$ and a corresponding second write address $Ai_2[14:0]$ are applied to input register 200, and the write enable signal WEN is asserted to a logic high value. The clock signal CLK subsequently transitions to a logic high value, thereby causing AND gate 203 to provide a logic high signal to enable register 200, and causing OR gate 206 to provide a logic high signal to enable register 201. In response, the first write data value $Di_1[63:0]$, the first write address $Ai_1[14:0]$ and the first check bit $CB_1[7:0]$ are latched into output register 201. In addition, the second write data value $Di_2[63:0]$ and the second write address $Ai_2[14:0]$ are latched into input register 200.

The logic high write enable signal WEN also causes OR gate 207 to provide a logic high signal to flip-flop 208. This logic high signal is latched into flip-flop 208 in response to the rising edge of the CLK signal. As a result, flip-flop 208 provides a logic high signal to the enable terminals of tri-state output buffers 210 and 211, thereby enabling these buffers. In response, output buffers 210 and 211 drive the first write data value $Di_1[63:0]$ and the first check bit $CB_1[7:0]$ from output register 201 to memory data bus MD[71:0]. The first write address value $Ai_1[14:0]$ is routed from output register 201 as write buffer tag address WBTag[14:0]. The write buffer tag address WBTag[14:0] is routed through multiplexer 104 to memory array 101 (FIG. 1) in response to the logic high WEN signal and the logic low REN signal. The first write data value $Di_1[63:0]$ and the first check bit $CB_1[7:0]$ (i.e., memory data word MD[71:0]) is written to memory array 101 at the location identified by write buffer tag address WBTag[14:0].

In the foregoing manner, write buffer/ECC generator 105 operates as a posted write buffer. That is, during a write access cycle, data and address values previously posted to write buffer/ECC generator 105 are used to perform a write access to memory array 101. New data and address values are posted to register 200, and corresponding check bits are generated during the same write access cycle. Registers 200-201 and ECC generator 202 are significantly faster than memory array 101. As a result, the operations performed within write buffer/ECC generator 105 do not slow down write accesses to memory array 101.

Note that it is necessary to maintain data coherence if a read access hits the contents of write buffer/ECC generator 105. To maintain data coherence, comparator 205 is coupled to receive both the current access address A[14:0] and the write address previously posted to input register 200. Comparator 205 asserts a logic high MATCH output signal if the current access address matches the write address stored in input register 200. The MATCH signal and the read enable signal REN are both provided to AND gate 204. If comparator 205 detects a match, and the current access is a read access (REN="1"), then AND gate 204 will assert a logic high write buffer hit signal WBHit, thereby indicating that the current read access has hit the contents of write buffer/ECC generator 105.

The WBHit signal is applied to an input terminal of memory access sequencer 102. When the WBHit signal is asserted to a logic high value, memory access sequencer 102 is prevented from generating the access control signals RAS#, SEN#, CAS#, and PRC#, thereby suppressing access to memory array 101. Instead, the read data is provided by write buffer/ECC generator 105 in the manner described below.

Within write buffer/ECC generator 105, the WBHit signal is applied to input terminals of OR gates 206 and 207. Thus, when the WBHit signal is asserted high, OR gate 206 provides a logic high signal to the clock input terminal of register 201. Consequently, the write data, write address and associated check bits stored in input register 200 are latched into output register 201 at this time. OR gate 207 provides a logic high signal to flip-flop 208. This logic high signal is latched into flip-flop 208 in response to the rising edge of the CLK signal. Tri-state output buffers 210 and 211 are enabled in response to the logic high signal latched into flip-flop 208. As a result, the data value and the corresponding ECC value stored in output register 201 are driven onto data bus MD[71:0]. The data and ECC values on data bus MD[71:0] are routed to error detection/correction unit 106. In response, error detection/correction unit 106 provides a corrected data value, which is routed through output driver 108 to data output bus Do[63:0], thereby completing the read access.

Although the present example uses output register 201, this element of write buffer 105 is not required in all embodiments. For example, the address stored in input register 200 can be driven directly as the write buffer tag address WBTag[14:0], the data value stored in input register 200 can be provided directly to output driver 210, and the corresponding check bits CB[7:0] can be provided directly to output driver 211. During a subsequent write operation, the data and address values stored in register 200 and the check bits provided by ECC generator 202 are latched directly into registers in memory array 101, thereby eliminating the need for output register 201.

Error Detection-Correction

Error detection/correction circuit 106 will now be described. Many different error detection/correction codes can be used in the present invention. For example, the odd-weight Hamming code discussed in U.S. Pat. No. 5,638,385, entitled "Fast Check Bit Write For a Semiconductor Memory" by John A. Fifield et al, and "Cost Analysis of On Chip Error Control Coding for Fault Tolerant Dynamic RAMs," by N. Jarwala et al, Proceedings of the Seventeenth International Symposium on Fault-Tolerant Computing, Pittsburgh, Pa., Jul. 6–8, 1987, pp. 278–283 can be used in one embodiment. In the described embodiment, the odd-weight Hamming Code discussed in "16-bit CMOS Error Detection And Correction Unit", Integrated Device Technology, Inc. Data Book, April 1990, Section 5.10, pp.

1–19 is used. The 72-bit modified Hamming Code provides single-bit error correction and double-bit error detection. The 72-bit code includes 64 data bits, and 8 check bits.

Implementation of error detection/correction using odd-weight Hamming code has been described in references including U.S. Pat. No. 5,638,385, entitled "Fast Check Bit Write For A Semiconductor Memory" by John A. Fifield et al., and "A Class Of Optimal Minimum Odd-Weight-Column SEC-DED Codes", by M. Y. Hsiao, IBM Journal of Research and Dev., Vol. 14, July, 1970, pp. 395–401. In a preferred embodiment, error detection/correction unit 106 uses mainly combinational logic. For syndrome generation, 3 levels of 4-input and 3-input exclusive OR gates can be used. For syndrome decoding, 5-input AND gates can be used. This kind of implementation using combinational logic is well known to the art of logic design and therefore is not described further.

Error detection/correction unit 106 includes check bit generator 111, syndrome generator and decoder 112, and error correction unit 113. During a read access, the odd-weight Hamming code is read from memory array 101 and driven on memory data bus MD[71:0]. Within error detection/correction unit, the memory bus is split into two fields: the read data word field RD[63:0] and the read check bit field RCB[7:0]. The read data word RD[63:0] is input to check bit-generator 111. The check-bit generator 111, similar to ECC generator 202 (FIG. 2), generates an 8-bit ECC check bit value in response to read data word RD[63:0]. This ECC check bit value is provided to syndrome generator and decoder 112. Syndrome generator and decoder 112 bit-wise compares (exclusive OR's) the read check bits RCB[7:0] with the ECC check bit value provided by check bit generator 111. The resultant 8-bit syndrome word is decoded to determine whether the 72-bit code read from the memory array is free of error, contains a single-bit error, or contains multiple-bit errors. In the case of a single-bit error, syndrome generator and decoder 112 generates an 8-bit signal identifying the location of the error bit from the syndrome, and activates a single-error identifier signal (1-ERR) to a logic high state. The 8-bit syndrome signal identifying the location of the error bit is transmitted to error correction unit 113. In response, error correction unit 113 corrects the error bit, which may exist in either the read data word RD[63:0] or the ECC check bit value RCB[7:0]. If no error is detected, the read data word RD[63:0] and ECC check bit value RCB[7:0] are not modified. In the case of multiple bit error, neither the read data word RD[63:0] nor the ECC check bit value RCB[7:0] is modified.

The read data value provided by error correction unit 113 is labeled as corrected data value CD[63:0] (even though it is understood that error correction unit 113 may not make any corrections to the read data value). Similarly, the ECC check bit value provided by error correction unit is designated as corrected ECC check bit value CCB[7:0]. The corrected data value CD[63:0] is driven through output driver 108 to the output data bus Do[63:0]. Both the corrected data value CD[63:0] and the corrected ECC check bit value CCB[7:0] are also driven to write-back buffer 107. If the single-error indicator signal 1-ERR is asserted high, the corrected data value CD[63:0], the corrected ECC check bit value CCB[7:0], and the corresponding latched address LA[14:0] associated with the read access are all written to write-back buffer 107. As described in more detail below, the corrected data value CD[63:0] and the corrected ECC check bit value CCB[7:0] are queued in write-back buffer 107, in anticipation of a write-back operation to memory array 101.

Write-Back Buffer

Figure 3:
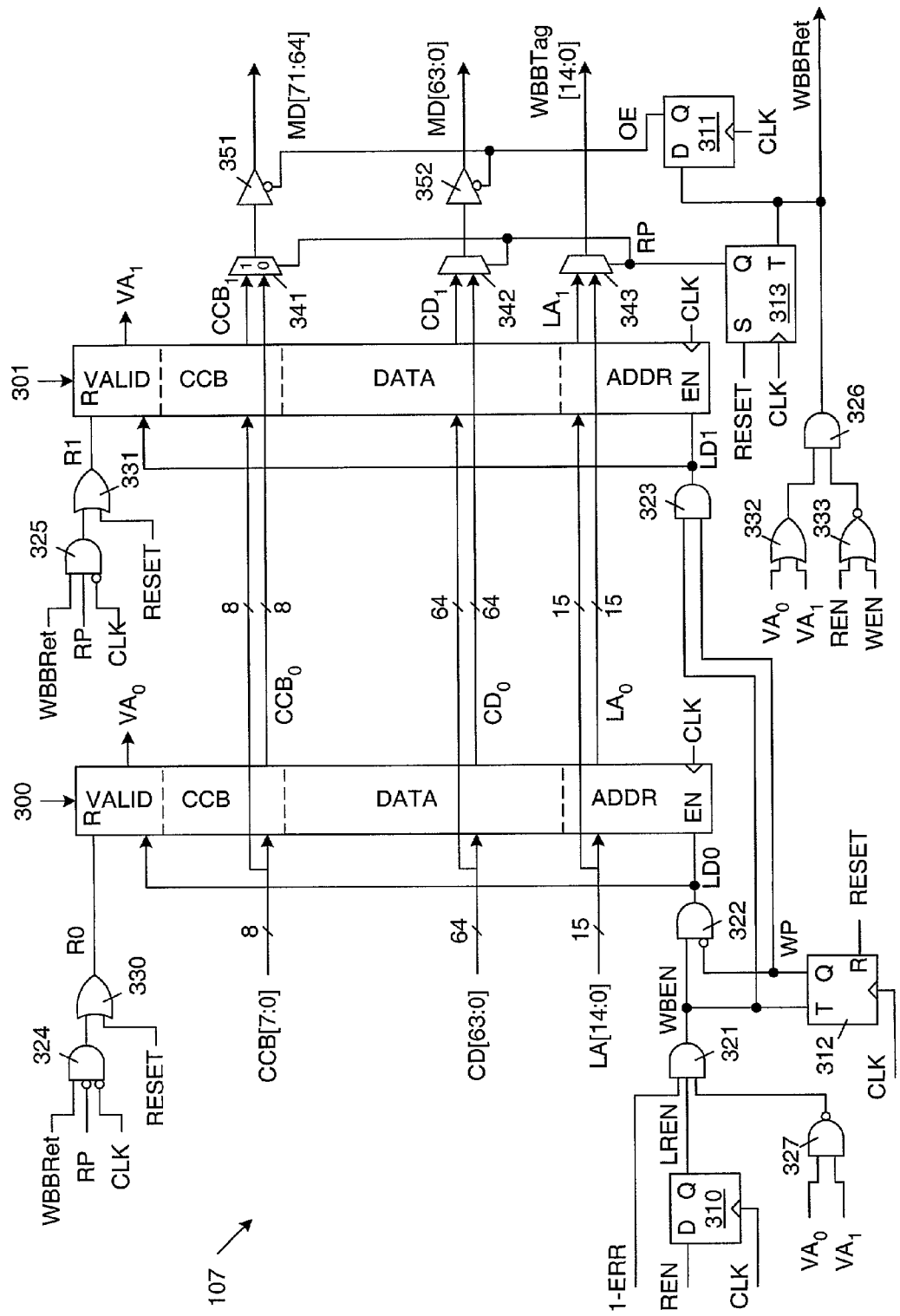
FIG. 3 is a circuit diagram illustrating a write-back buffer in accordance with one embodiment of the present invention.

FIG. 3 is a circuit diagram illustrating write-back buffer 107 in accordance with one embodiment of the present invention. In this embodiment, write-back buffer 107 includes registers 300–301, D-type flip-flops 310–311, toggle flip-flops 312–313, AND gates 321–326, NAND gate 327, OR gates 330–332, NOR gate 333, output multiplexers 341–343 and tri-state output drivers 351–352. Registers 300–301 provide storage for 2 entries, wherein each entry includes an address field (ADDR), a data field (DATA) a correction check bit field (CCB) and a valid bit field (VALID). The valid bit field, when set to a logic '1' value, indicates that the contents of the corresponding register are valid and should be written-back to memory array 101. Registers 300 and 301 are arranged in a FIFO configuration in the described embodiment.

The address fields of registers 300 and 301 are coupled to receive the latched address signal LA[14:0], the data fields of registers 300 and 301 are coupled to receive the corrected data value CD[63:0], and the correction check bit fields of registers 300 and 301 are coupled to receive the corrected check bits CCB[7:0]. The address, data, correction bit and valid fields of register 300 are labeled $LA_0$, $CD_0$, $CCB_0$ and $VA_0$, respectively. The address, data, corrected check bit and valid fields of register 301 are labeled $LA_1$, $CD_1$, $CCB_1$ and $VA_1$, respectively. Corrected check bit values $CCB_0$ and $CCB_1$ stored in registers 300 and 301 are provided to multiplexer 341. Corrected data values $CD_0$ and $CD_1$ stored in registers 300 and 301 are provided to multiplexer 342. Latched address values $LA_0$ and $LA_1$ stored in registers 300 and 301 are provided to multiplexer 343.

Multiplexers 341–343 are controlled by the Q output of toggle flip-flop 313, which operates as a read pointer value, RP. If the read pointer value RP provided by flip-flop 313 has a logic "0" value, then multiplexers 341, 342 and 343 route the $CCB_0$, $CD_0$ and $LA_0$ values, respectively. Conversely, if the read pointer value RP has a logic "1" value, then multiplexers 341, 342 and 343 route the $CCB_1$, $CD_1$ and $LA_1$ values, respectively.

The outputs of multiplexers 341 and 342 are routed to tri-state output drivers 351 and 352, respectively. Tri-state drivers 351 and 352 are controlled by the output enable signal OE provided at the Q output terminal of flip-flop 311. When enabled, tri-state buffers 351 and 352 drive the signals received from multiplexers 341 and 342 as memory data output signals MD[71:64] and MD[63:0], respectively. The output of multiplexer 343 is directly provided as write-back buffer tag address WBBTag[14:0].

In general, write-back buffer 107 operates as follows. When a single error is detected by error detection/correction unit 106 during a read operation, the corrected data value, the corrected check bit value and the associated address value are written to one of registers 300-301 in write-back buffer 107. During a subsequent idle cycle, the corrected data value and corrected check bit value are written back to memory array 101 at the location specified by the associated address value.

The operation of write-back buffer 107 will now be described in more detail. To initialize write-back buffer 107, the RESET signal is initially asserted high. In response, OR gates 330 and 331 provide logic high reset values R0 and R1 to registers 300 and 301, respectively. These logic high reset values R0 and R1 asynchronously reset the VALID bit fields of registers 300 and 301 to logic "0" values (i.e., $VA_0=VA_1$="0"). The logic "0" VALID bits $VA_0$ and $VA_1$ cause OR gate 332 to provide a logic "0" output signal to AND gate 326, thereby forcing the write-back buffer retire signal WBBRet to a logic "0" value. The logic "0" WBBRet signal is latched into flip-flop 311, such that the output enable signal OE initially has a logic "0" value, thereby disabling tri-state output drivers 351–352. When the WBBRet signal has a logic "0" value, no corrected data values are written back to memory array 101. The logic "0" WBBRet signal is also applied to AND gates 324 and 325. As a result, the WBBRet signal causes the reset values R0 and R1 provided by OR gates 330 and 331 to initially remain at logic "0" values after the RESET signal transitions to a logic "0" value.

The logic high RESET signal also sets the read pointer value RP provided by toggle flip-flop 313 to a logic "1" value, such that multiplexers 341–343 are initially set to pass the $CCB_1$, $CD_1$ and $LA_1$ values, respectively, from register 301.

The logic high RESET signal also resets the Q output of toggle flip-flop 312 to a logic "0" value. The Q output of toggle flip-flop 312 operates as a write pointer value WP. When the write pointer value WP is low, register 300 is designated to receive the corrected check bit value CCB[7:0], the corrected data value CD[63:0], and the latched address value LA[14:0]. Conversely, when the write pointer value WP is high, register 301 is designated to receive these values CCB[7:0], CD[63:0] and LA[14:0]. More specifically, when the write pointer value WP is low, AND gate 322 is enabled to pass the write buffer enable signal WBEN to the enable input terminal of register 300 as the load signal LD0. When the write pointer value WP is high, AND gate 323 is enabled to pass the write buffer enable signal WBEN to the enable input terminal of register 301 as the load signal LD1.

The write buffer enable signal WBEN is provided by AND gate 321. AND gate 321 is coupled to receive the 1-ERR signal from error detection-correction circuit 106. AND gate 321 is also coupled to receive a latched read enable signal LREN provided at the Q output of flip-flop 310. (The read enable signal REN is latched into flip-flop 310 in response to the CLK signal to provide the latched read enable signal LREN). AND gate 321 is also coupled to receive the output of NAND gate 327, which has input terminals coupled to receive valid bits $VA_0$ and $VA_1$. Thus, the write buffer enable signal WBEN signal will be asserted high if there is a single error detected in a read data value (1-ERR="1") during a read operation (LREN="1") and there is an available entry in one of registers 300 and 301 ($VA_0$ and $VA_1$ not="11").

The first time that there is a single error detected during a read operation, the write buffer enable signal WBEN is asserted high. In response to the high WBEN signal and the low write pointer value WP, AND gate 322 asserts a logic high load signal LD0, which enables register 300. In response, the CCB[7:0], CD[63:0] and LA[14:0] values provided during the read operation are latched into register 300. In addition, the logic high LD0 signal is latched into the VALID field of register 300, thereby setting valid bit $VA_0$ to a logic high state.

The logic high valid bit $VA_0$ causes OR gate 332 to provide a logic high signal to AND gate 326. During a subsequent idle cycle when there are no pending read or write accesses (i.e., REN=WEN="0"), AND gate 326 will receive a logic high signal from NOR gate 333. Under these conditions, the write-back buffer retire signal WBBRet is asserted high, thereby indicating that the contents of register 300 can be retired to memory array 101, without interfering with a read or write operation. On the next rising edge of the CLK signal, the logic high WBBret signal toggles the read pointer value RP provided by flip-flop 313 to a logic "0" value, and causes the output enable signal OE of flip-flop 311 to transition to a logic "1" value. At this time, multiplexers 341–343 route the $CCB_0$, $CD_0$ and $LA_0$ signals from register 300. Tri-state buffers 351 and 352 are enabled to drive the $CCB_0$ and $CD_0$ values from register 300 as the MD[71:64] and MD[63:0] values in response to the logic high output enable signal OE. The latched address value $LA_0$ from register 300 is provided to memory array 101 as the write back buffer tag address WBBTag[14:0]. Note that the WBBTag[14:0] signal is routed through address multiplexer 104 in response to the logic low REN and WEN signals.

The logic high WBBRet signal is also provided to memory array sequencer 102, thereby initiating the generation of the memory control signals (RAS#, SEN#, CAS#, PRC#) required to write the corrected data back to memory array 101. At this time, the corrected data value $CD_0$ and corrected check bit value $CCB_0$ are written back to memory array 101 at the location identified by address value $LA_0$.

The CLK signal subsequently transitions to a logic low level. At this time, the logic low CLK signal, the logic high WBBRet signal and the logic low read pointer value RP cause AND gate 324 to provide a logic high output signal. In response, OR gate 330 asserts a logic high reset signal R0, which resets the valid bit $VA_0$ in register 300 to a logic "0" value. The logic low $VA_0$ bit causes the WBBRet signal to transition to a logic low value.

As described above, the entry stored in register 300 is retired during an idle cycle (i.e., WEN=REN="0"). However, as long as consecutive read or write operations occur, there will be no idle cycle during which the entry in register 300 can be retired. In this case, this entry remains in register 300.

If another read operation (REN="1") having a single error (1-ERR="1") occurs before the next idle cycle, AND gate 321 will again assert the write buffer enable signal WBEN to a logic "1" value. The logic "1" value of the WBEN signal causes flip flop 312 to toggle, such that the write pointer value WP is changed to a logic "1" value. This logic high WP signal causes AND gate 323 to assert a logic high load signal LD1. In response, the CCB[7:0], CD[63:0] and LA[14:0] signals associated with the current read operation are loaded into register 301 as values $CCB_1$, $CD_1$ and $LA_1$, respectively. The logic high load signal LD1 is also loaded into the VALID field of register 301, such that valid bit $VA_1$ has a logic high value.

At this time, both of the valid bits $VA_0$ and $VA_1$ have logic "1" values. As a result, NAND gate 327 provides a logic "0" value to AND gate 321. Consequently, the write buffer enable signal WBEN cannot be asserted until at least one of the valid bits $VA_0$ and $VA_1$ transitions to a logic "0" value. That is, no additional entries can be written to write-back buffer 107 until the entry stored in register 300 has been retired to memory array 101. Note that if a single error condition exists during a subsequent read operation (before the entry in register 300 can be retired), then the corresponding corrected data value/check bits will not be written back to memory array 101. However, the corrected data value will be read out of memory device 100. Thus, failure to writeback the corrected value does not result in failure of memory device 100. It is likely that the next time that this data value/check bit is read from memory array 101, space will be available in write-back buffer 107, such that the corrected data value/check bit can be properly written back to memory array 101.

Specific examples of write, read and write-back operations will now be described.

Write Access Timing

Figure 4:
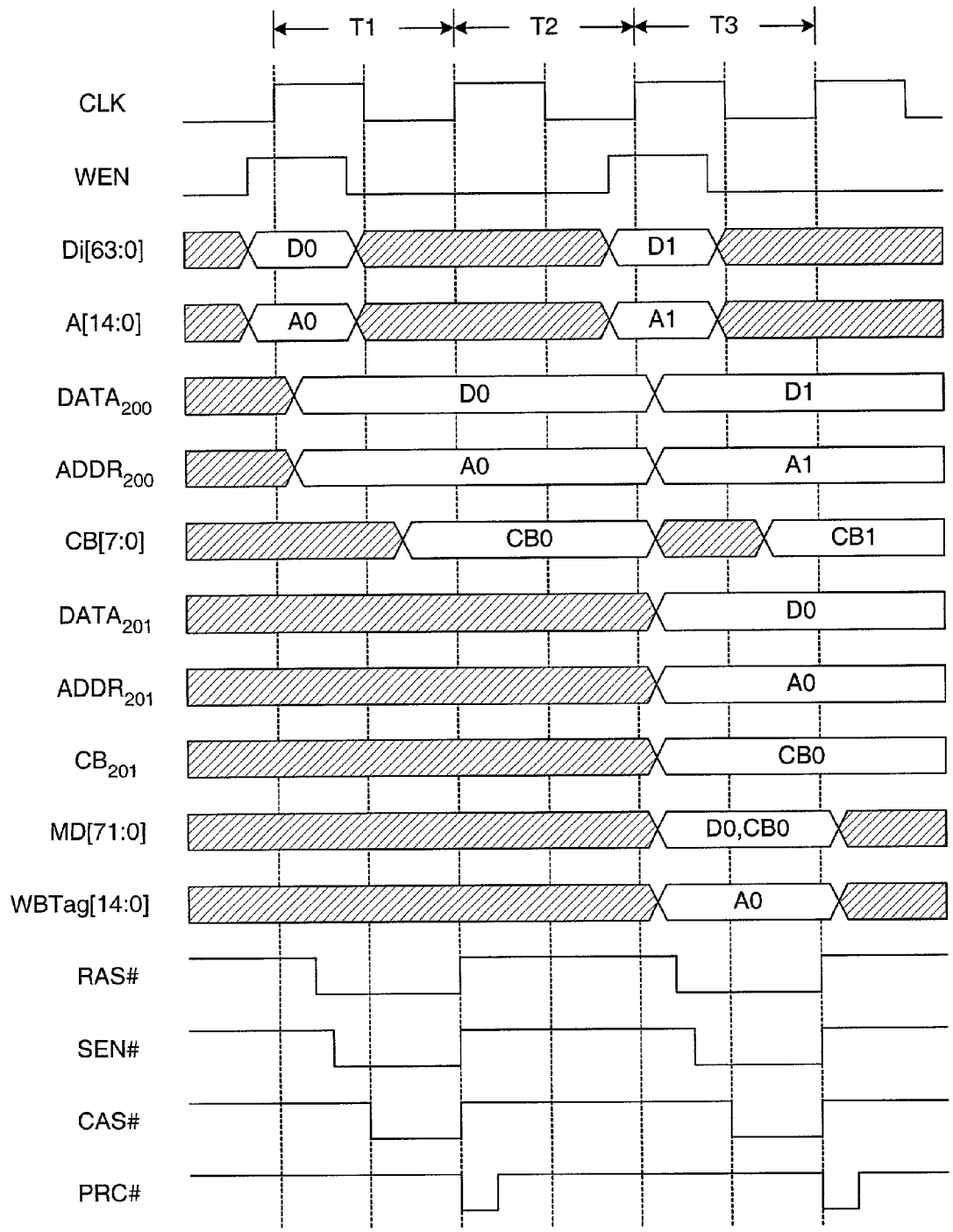
FIG. 4 is a waveform diagram illustrating the timing of a write access in accordance with one embodiment of the present invention.

FIG. 4 is a waveform diagram illustrating the timing of two write accesses in accordance with one embodiment of the present invention. Prior to the rising edge of clock cycle T1, the write enable signal WEN is asserted high, a first write data value D0 is provided on input data bus Di[63:0], and a first write address value A0 is provided on address bus A[14:0]. At the rising edge of clock cycle T1, the first write data value D0 and the first write address A0 are latched into register 200. In FIG. 4, the write data value stored in register 200 is designated as $DATA_{200}$ and the address value stored in register 200 is designated as $ADDR_{200}$. During cycle T1, ECC generator 202 generates an ECC check bit value, CB0, in response to the first write data value D0 stored in register 200. Note that memory array sequencer 102 asserts the memory control signals RAS#, SEN#, CAS# and PRC# during the first clock cycle T1 in response to the logic high write enable signal WEN. However, this write access is ignored in the present example for reasons of clarity.

No write access is performed during clock cycle T2 (i.e., the WEN signal is low). As a result, the first write data value D0 and the first write address A0 remain latched in register 200 during cycle T2.

Prior to the rising edge of clock cycle T3, the write enable signal WEN is asserted high, a second write data value D1 is provided on input data bus Di[63:0], and a second write address value A1 is provided on address bus A[14:0]. At the rising edge of clock cycle T3, the first write data value D0, the first write address A0 and the first ECC check bit value CB0 are latched into register 201. In FIG. 4, the write data value stored in register 201 is designated as $DATA_{201}$, the address value stored in register 201 is designated as $ADDR_{201}$, and the ECC check bit value stored in register 201 is designated as $CB_{201}$. Also at the rising edge of clock cycle T3, the second write data value D1 and the second write address value A1 are latched into register 200. During cycle T3, ECC generator 202 generates an ECC check bit value, CB1, in response to the second write data value D1 stored in register 200.

The logic high write enable signal WEN enables output buffers 210 and 211, such that these output buffers drive the first data value D0 and the first ECC check bit value CB0 from register 201 onto memory data bus MD[71:0]. The first write address A0 is provided from register 201 as the write buffer tag signal WBTag[14:0]. This write buffer tag signal WBTag[14:0] is routed through multiplexer 104 to memory array 101 in response to the logic high write enable signal. Memory array sequencer, asserts the memory write signal Mwrite and the memory control signals RAS#, SEN#, CAS# and PRC# in response to the logic high write enable signal WEN during cycle T3, thereby enabling the first write data value D0 and the first ECC check bit value CB0 to be written to memory array 101 at the location specified by the first write address A0. Note that the second write data value D1 and the second write address A1 remain in register 200 until the next write access (or the next read access that hits write buffer 105). Also note that ECC check bit value CB1 are waiting at the output of ECC generator 202 until the beginning of the next write access. In this manner, the generation of ECC check bit values doe not affect the write access latency of memory device 100.

Single Read Access and Write-Back Timing

Figure 5:
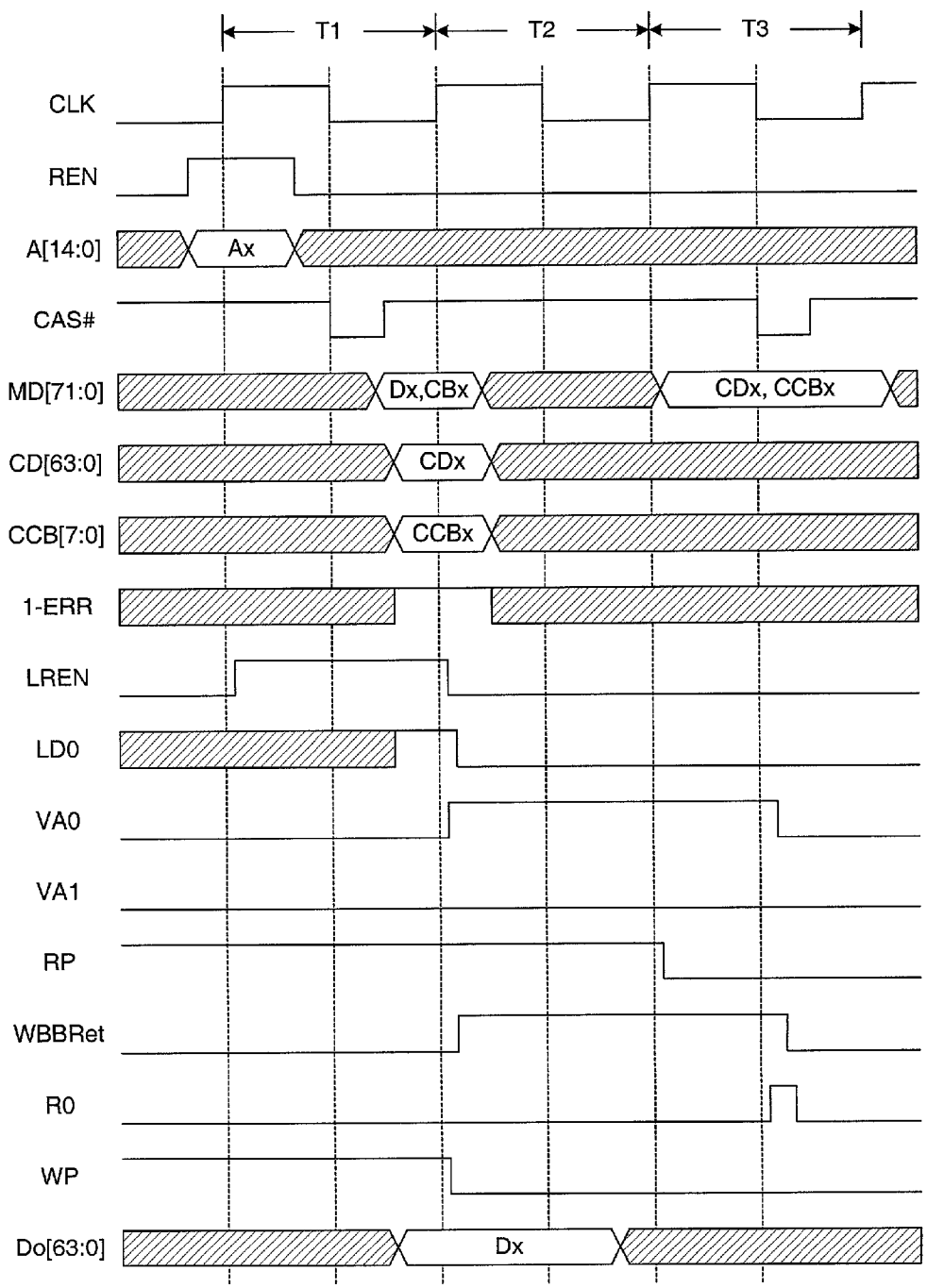
FIG. 5 is a waveform diagram illustrating the timing of a read transaction followed by a write-back operation in accordance with one embodiment of the present invention.

FIG. 5 is a waveform diagram illustrating the timing of a read transaction followed by a write-back operation in accordance with one embodiment of the present invention. Before the rising edge of clock cycle T1, the read enable signal REN is asserted high and a read address Ax[14:0] is provided on address bus A[14:0] to initiate a read access. At the rising edge of cycle T1, the read address Ax[14:0] is latched into address register 103 as the latched read address LAx[14:0]. This latched read address LAx[14:0] is driven to the memory address bus MA[14:0] through multiplexer 104. Multiplexer 104 routes the latched read access address LAx[14:0] in response to the high state of read enable signal REN and the low state of the write enable signal WEN.

The logic high read enable signal REN is also latched into memory array sequencer 102 in response to the rising edge of cycle T1. In response, memory array sequencer 102 sequentially activates the memory array control signals RAS#, SEN#, CAS#, and PRC#, thereby reading the Hamming code word (i.e., MDx[71:0]) associated with the latched read address LAx[14:0]. Note that the only memory array control signal shown in FIG. 5 is the CAS# signal. The high state of the latched read enable signal REN in memory array sequencer 102 causes the memory write signal MWrite have a logic low value, thereby indicating that the present memory operation is a read access. Consequently, the accessed word MDx[71:0] is read out from the memory array on data bus MD[71:0].

The 72-bit accessed word MDx[71:0] is provided to error detection-correction unit 106, wherein the data portion of the word (i.e., MDx[63:0]) and the check-bit portion of the word (i.e., MDx[71:64]) are separated for syndrome generation, error detection and correction. If a single-bit error is detected, syndrome generator 112 activates the single-error signal (1-ERR) high, and error correction unit 113 corrects the single-bit error in either the data word or the check-bits. The corrected data word CDx[63:0] is driven through output driver 108 as the output data value Do[63:0].

Within write-back buffer 107, flip-flop 310 latches the logic high read enable signal REN at the rising edge of cycle T1, thereby providing a logic high latched read enable signal LREN. When the single error signal 1-ERR is activated high by syndrome generator 112, AND gate 321 activates the write buffer enable signal WBEN to a logic high state. AND gate 322 activates the load data signal LD0 to a logic high value in response to the logic high WBEN signal and the logic low write pointer value WP. At the beginning of clock cycle T2, the CLK signal transitions to a logic high state, thereby activating register 300, such that the logic high LD0 signal, the corrected check bits CCBx[7:0], the corrected data word CDx[63:0] and the associated latched address LAx[14:0] are written to register 300 of write-back buffer 107. At the this time, the valid bit $VA_0$ transitions to a logic high state, and the corrected ECC code word, consisting of corrected check bits CCBx[7:0] and the corrected data word CDx[63:0], is available at the output of register 300.

At the beginning of cycle T2, both the read enable signal REN and the write enable signal WEN are low, thereby indicating the absence of an external access. However, the valid signal $VA_0$ goes high after the rising edge of clock cycle T2. As a result, WBBRet signal has a low state at the rising edge of cycle T2. Thus, even though no external access is requested during cycle T2, write-back does not take place during cycle T2.

At the beginning of cycle T3, the high state of the WBBRet signal toggles the output of toggle flip-flop 313

(i.e., read pointer value RP) from high to low. The low state of the read pointer signal RP causes multiplexers 341–343 to route the corresponding contents of register 300. As a result, the latched address value LAx[14:0] stored in register 300 is driven as the write-back buffer tag address WBBTagx[14:0]. The WBBTagx[14:0] signal is provided to multiplexer 104. Multiplexer 104 routes the WBBTagx[14:0] signal as the memory address signal MA[14:0] in response to the logic low states of the REN and WEN signals. Multiplexers 341 and 342 route the corrected check bit value CCBx[7:0] and the corrected data word CDx[63:0] to tri-state buffers 351 and 352, respectively. The output enable signal OE is asserted high when the high state of the WBBRet signal is latched into flip-flop 311 at the rising edge of cycle T3. The high OE signal enables tri-state buffers 341 and 342 to drive the corrected check bit value CCBx[7:0] and the corrected data word CDx[63:0] onto memory data bus MD[71:0].

Memory array sequencer 102 latches the logic high WBBRet signal at the rising edge of cycle T3, thereby resulting in the sequential activation of the memory control signals RAS#, SEN#, CAS# and PRC#. Memory array sequencer 102 also asserts the MWrite signal in response to the logic high WBBRet signal. As a result, the word on data bus MD[71:0] is written to the memory location specified by the address WBBTag[14:0]. At the falling edge of the CLK signal in cycle T3, AND gate 324 provides a logic high output signal, thereby driving the reset signal R0 to a logic high state. The logic high reset signal R0 resets the valid bit $VA_0$ to a logic low value. The logic low valid bits $VA_0$ and $VA_1$ cause OR gate 333 to provide a logic "0" output signal, which in turn, causes the WBBRet signal to transition to a logic "0" state. At the end of CLK cycle T3, the control signals RAS#, SEN#, CAS# and PRC# are de-asserted high, thereby completing the memory write operation and write-back cycle.

Notice that if a single-bit error does not occur in the read access of cycle T1, then neither the data nor the check bits read from memory array 101 will be corrected or stored in write-back buffer 107. However, the uncorrected data is still driven out to the output data bus Do[63:0] by output driver 108.

Back-to-Back Read Cycles and Write-Back Cycles

Figure 6:
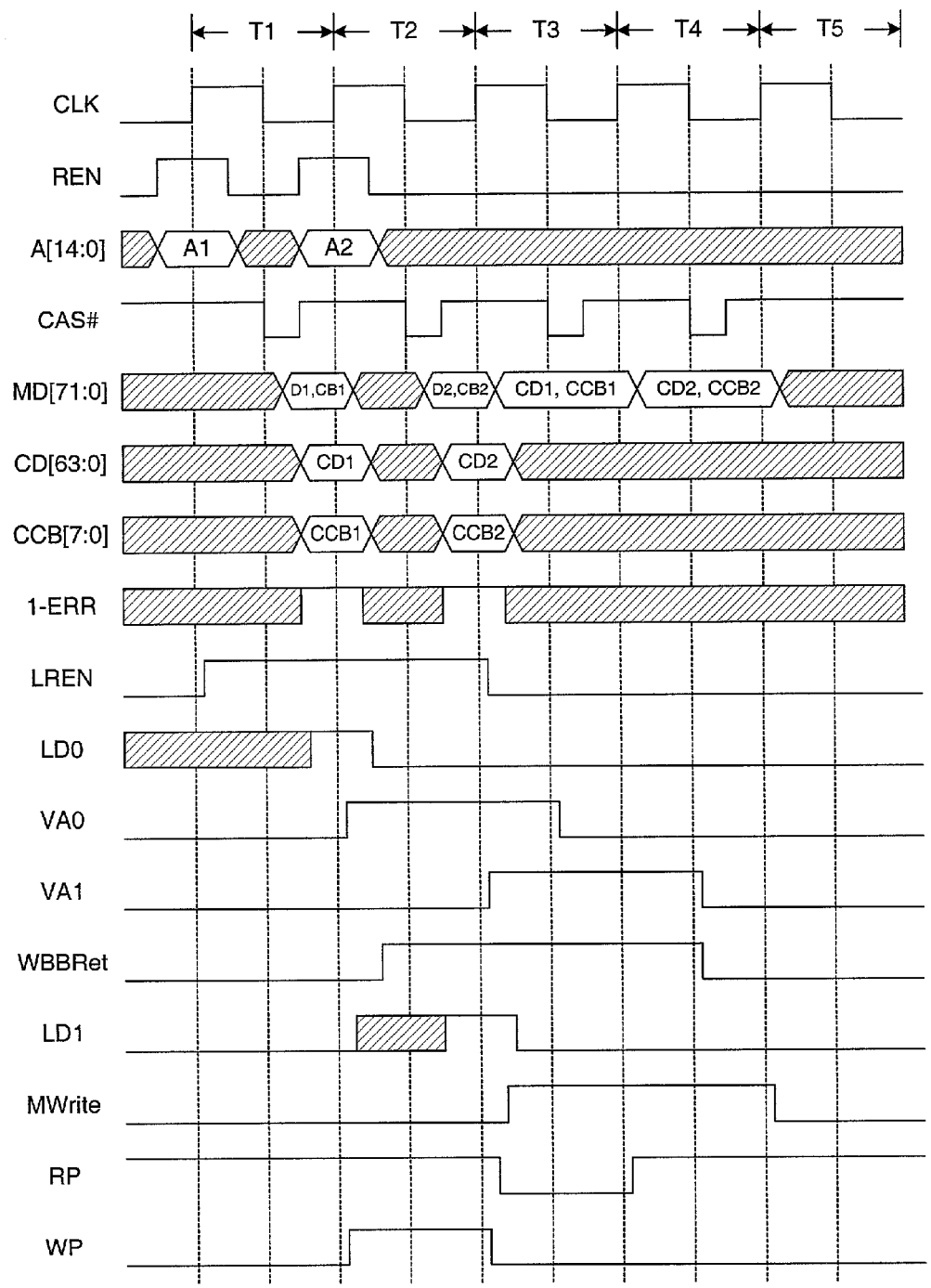
FIG. 6 is a waveform diagram illustrating the timing of two consecutive read access cycles followed by two consecutive write-back cycles in accordance with one embodiment of the present invention.

FIG. 6 is a waveform diagram illustrating the timing of two consecutive read access cycles followed by two consecutive write-back cycles in accordance with one embodiment of the present invention. Before the rising edge of clock cycle T1, the read enable signal REN is asserted high and a read address A1[14:0] is provided on address bus A[14:0] to initiate a read access. The read cycle operations and the control timing waveforms are similar to those shown in FIG. 5. A single-bit error is detected in this first read access, which results in the corrected Hamming code word (CD1/CCB1) and address A1[14:0] being stored in register 300 of write-back buffer 107. At the rising edge of cycle T2, the high state of the 1-ERR and LREN signals causes toggle flip-flop 312 to change the write pointer value WP from a logic "0" value to a logic "1" value, thereby configuring register 301 of write-back buffer 107 to receive the next corrected Hamming code word and address.

Before the rising edge of clock cycle T2, another read enable signal REN is asserted high and a second read address A2[14:0] is provided on address bus A[14:0] to initiate a second read access. Again, the read cycle operations and the control timing waveforms are similar to those shown in FIG. 5. A single-bit error is detected in this second read access. In response, error detection-correction circuit 106 asserts the 1-ERR signal and provides a corrected Hamming code word that includes corrected data CD[63:0] and corrected check bit CCB2[7:0]. In response to the logic high 1-ERR signal, the logic high LREN signal, and the logic high output of NAND gate 327, AND gate 321 provides a logic high write buffer enable signal WBEN. In response to the logic high WBEN signal and the logic "1" write pointer value, AND gate 323 asserts the load signal LD1 to a logic high value, thereby enabling register 301. On the rising edge of cycle T3, the corrected Hamming code word (CD2/CCB2), address A2[14:0] and the high state of LD1 are latched into register 301 of write-back buffer 107. Consequently, valid bit $VA_1$ is driven to a logic high value.

At the end of cycle T2, the low states of the REN and WEN signals indicate the absence of an external memory access. The low states of the REN and WEN signals, along with the high state of the $VA_0$ signal causes AND gate 326 to assert a logic high WBBRet signal. In write-back buffer 107, this high WBBRet signal is latched into flip-flop 311 at the rising edge of cycle T3, thereby causing output enable signal OE to go high. The high state of the WBBRet signal at the rising clock-edge also causes toggle flip-flop 313 to drive the read pointer value RP to a logic "0" state. Consequently, first address A1[14:0] stored in register 300 is driven as the output signal WBBTag[14:0], while the corrected data and check bits CD1[63:0] and CCB1[7:0] stored in register 300 are driven as output signal MD[71:0]. The write-back buffer tag WBBTag[14:0] is provided to memory array 101 through multiplexer 104 in response to the logic low REN and WEN signals. In memory array sequencer 102, the high state of the WBBRet signal is latched at the beginning of cycle T3. Subsequently, the MWrite signal is driven high and the memory array control signals RAS#, SEN#, CAS# and PRC# are activated in sequence so that memory array 101 goes through a memory write cycle with the corrected code word MD[71:0] written to the location specified by WBBTag[14:0]. The reset signal R0 goes high in response to the falling edge of cycle T3, thereby resetting the valid bit $VA_0$ in register 300. Resetting valid bit $VA_0$ invalidates the contents of register 300. At the end of cycle T3, the memory array control signals are all deactivated high and memory array 101 is ready for another access.

At the end of cycle T3, the low states of the REN and WEN signals again indicate the absence of an external memory access. The low states of the REN and WEN signals, together with the high state of valid bit $VA_1$ causes the WBBRet signal to remain in a logic high state. At the beginning of cycle T4, the high state of the WBBRet signal causes the read pointer value RP provided by toggle flip-flop 313 to transition to a logic high state. As a result, multiplexers 341–343 are controlled to route the corrected check bit CCB2[7:0] and the corrected data value CD2[63:0] as the MD[71:0] value, and the address value A2[14:0] as the write back buffer tag value WBBTag[14:0]. Note that the output enable signal OE remains in a logic high state in response to the logic high WBBRet signal. In memory array sequencer 102, the high state of the WBBRet signal is latched at the rising edge of cycle T4. The high state of the WBBRet signal causes the MWrite signal to remain high, thereby starting another write cycle in memory array 101. The write cycle is performed with the successive activation of the RAS#, SEN#, CAS# and PRC# signals. This results in the modified Hamming code word MD[71:0] from register 301 being written back to memory array 101 at the location (A2) specified by the WBBTag[14:0] read from register 301. The reset signal R1 goes high in response to the falling edge of cycle T4, thereby resetting the valid bit $VA_1$ in register 301. Resetting valid bit $VA_1$ invalidates the contents of register 301. At the end of cycle T4, the memory array control signals are all deactivated high and memory array 101 is ready for another access. When the valid bit $VA_1$ transitions to a logic low state, both of valid bits $VA_0$ and $VA_1$ have logic low values. As a result, OR gate 332 provides a logic low output signal, which causes the WBBRet signal to transition to a logic low state. The logic low valid bits VA0 and VA1 indicate that both entries of write-back buffer 107 have been retired to memory array 101.

Note that if another read access occurs during cycle T3 with a single-bit error on the accessed code word, then the corrected code word will not be written in the write-back buffer, because both of the valid bits $VA_0$ and $VA_1$ are high. The high valid bits $VA_0$ and $VA_1$ cause the output of NAND gate 327 to go low, and the output of AND gate (i.e., write-back enable signal WBEN) to go low. The low state of the WBEN signal prevents the load signals LD0 and LD1 from being asserted, and thereby prohibits writing new entries to registers 300 and 301. Rather, the entries in registers 300 and 301 are preserved for subsequent write-back operations. The corrected code resulted from this third read access is not written back to the memory array 101. However, this does not result in memory failure as long as the memory word does not accumulate another error bit, because this code word can still be read and corrected during a subsequent read access.

Although the invention has been described in connection with several embodiments, it is understood that this invention is not limited to the embodiments disclosed, but is capable of various modifications, which would be apparent to a person skilled in the art. For example, although the described embodiments have focused on a memory array using DRAM cells, it is understood that a memory array using SRAM cells or non-volatile memory cells can be implemented in other embodiments with some modification to the memory array sequencer. Such modification could be readily accomplished by one of ordinary skill in the art of memory design. Thus, the invention is limited only by the following claims.

The invention claimed is:

1. A semiconductor memory device comprising:
   a memory array configured to store data values and corresponding error correction code values;
   a first register configured to store a first write data value and a corresponding first write address value during a first write access to the memory array;
   an error correction code (ECC) generator configured to receive the first write data value from the first register, and in response, generate a first ECC value during the first write access to the memory array, the ECC generator being configured to provide the first ECC value as long as the first write data value is stored in the first register;
   means for outputting the first write data value and the first ECC value during a read access if a read address value associated with the read access matches the first write address value stored in the first register; and
   means for writing the first write data value and the first ECC value to a location in the memory array associated with the first write address value during a second write access.

2. The semiconductor memory device of claim 1, further comprising a second register configured to receive and store the first write data value and the corresponding first write address value from the first register, and the first ECC value from the error correction code generator, the second register being coupled to the memory array.

3. The semiconductor memory device of claim 1, wherein the means for outputting comprises a comparator coupled to receive the first write address value stored in the first register and the read address value associated with the read access, thy comparator asserting a match control signal when the first write address value matches the read address value associated with the read access.

4. The semiconductor memory device of claim 3, wherein the means for outputting further comprises a logic circuit coupled to receive the match control signal and a read enable signal, the logic circuit asserting a hit signal to indicate that a read access has hit the first register when the match control signal and the read enable signal are both asserted.

5. The semiconductor memory device of claim 2, wherein the first register and the second register form a double buffered write-buffer arranged in a first in, first out (FIFO) configuration.

6. The semiconductor memory device of claim 1, wherein the first register is further configured to store a second write data value and a corresponding second address value during the second write access to the memory array, and wherein the error correction code (ECC) generator is further configured to receive the second write data value from the first register, and in response, generate a second ECC value during the second write access to the memory array.

7. A method of operating a semiconductor memory comprising:
   storing a first write data value and a corresponding first write address in a first stage of a write buffer during a first write access;
   generating a first error correction code (ECC) value in response to the first write data value stored in the first stage of the write buffer during the first write access and providing the first ECC value as long as the first write data value is stored in the first register;
   transferring the first write data value, the first ECC value and the first write address to a memory array during a second write access;
   writing the first write data value and the first ECC value to a location in the memory array identified by the first write address during the second write access;
   storing a second write data value and a corresponding second write address in the first stage of the write buffer during the second write access; and
   generating a second error correction code (ECC) value in response to the second write data value stored in the first stage of the write buffer during the second write access and providing the second ECC value as long as the second write data value is stored in the first register.

8. The method of claim 7, further comprising:
   transferring the first write data value, the first ECC value and the first write address into a second stage of the write buffer during the second write access; and
   writing the first write data value and the first ECC value from the second stage of the write buffer to the location in the memory array identified by the first write address during the second write access.

9. The method of claim 7, further comprising driving the first write data value and the first ECC value to the memory array by enabling tri-state buffers during the second write access.

10. The method of claim 7, further comprising outputting the first write data value and the first ECC value if a read address of a read access matches the first write address value stored in the first stage of the write buffer.

11. The method of claim 10, further comprising inhibiting access to the memory array if a read address of a read access matches the first write address value stored in the first stage of the write buffer.

12. A semiconductor memory device comprising:
a memory array configured to store data/error correction code (ECC) values, wherein each data/ECC value includes a data value and a corresponding error correction code (ECC) value;
an error detection/correction circuit coupled to receive a first data/ECC value from a first address of the memory array during a first read access, the error detection/correction circuit being configured to generate a corrected first data/ECC value and assert an error indicator signal upon detecting an error in the first data/ECC value; and
a write-back buffer configured to store the corrected first data/ECC value in response to the asserted error indicator signal, the write-back buffer further being configured to write the corrected first data/ECC value to the first address of the memory array during an idle cycle of the memory device.

13. The semiconductor memory device of claim 12, wherein the write-back buffer includes multiple entries, and is arranged in a first in, first out (FIFO) configuration.

14. The semiconductor memory device of claim 12, wherein the write-back butter includes multiple entries, and is arranged in a last in, first out (LIFO) configuration.

15. The semiconductor memory device of claim 12, wherein the write-back buffer includes multiple entries, the write-back buffer including a circuit to prevent write operations to the write-back buffer when all of the entries of the write-back buffer are full.

16. A method of operating a semiconductor device, the method comprising:
storing a plurality of data/error correction code (ECC) values in a memory array, wherein each data/ECC value includes a data value and a corresponding error correction code (ECC) value;
generating a first corrected data/ECC value in response to a first data/ECC value retrieved from a first address of the memory array during a first read access, wherein the first data/ECC value includes an error;
asserting an error indicator signal to indicate that the first data/ECC value includes an error;
storing the first corrected data/ECC value and the first address in a write-back buffer in response to the asserted error indicator signal; and
writing the first corrected data/ECC value to the first address of the memory array during an idle cycle of the memory device.

17. The method of claim 16, further comprising:
generating a second corrected data/ECC value in response to a second data/ECC value retrieved from a second address of the memory array during a second read access, wherein the second data/ECC value includes an error;
asserting the error indicator signal to indicate that the second data/ECC value includes an error;
storing the second corrected data/ECC value and the second address in the write-back buffer in response to the asserted error indicator signal, wherein the first corrected data/ECC value and the second corrected data/ECC value are stored in the write-back buffer at the same time; and
writing the second corrected data/ECC value to the second address of the memory array during an idle cycle of the memory device.

18. A semiconductor memory device comprising:
a memory array configured to store data/error correction code (ECC) values, wherein each data/ECC value includes a data value and a corresponding error correction code (ECC) value;
a write buffer/error correction code (ECC) generator configured to receive and store a write data value and a corresponding write address value, and generate an ECC value in response to the write data value during a first write access;
circuitry for routing the write data value, write address value and ECC value to the memory array during a second write access;
an error detection/correction circuit coupled to receive a first data/ECC value from a first address of the memory array during a first read access, the error detection/correction circuit being configured to generate a corrected first data/ECC value and assert an error indicator signal upon detecting an error in the first data/ECC value; and
a write-back buffer configured to store the corrected first data/ECC value in response to the asserted error indicator signal, the write-back buffer further being configured to write the corrected first data/ECC value to the first address of the memory array during an idle cycle of the memory device.

19. A method of operating a semiconductor memory comprising:
storing a first write data value and a corresponding first write address in a first stage of a write buffer during a first write access;
generating a first error correction code (ECC) value in response to the first write data value stored in the first stage of the write buffer during the first write access;
transferring the first write data value, the first ECC value and the first write address into a second stage of the write buffer during a second write access;
writing the first write data value and the first ECC value from the second stage of the write buffer to a first address in a memory array identified by the first write address during the second write access;
reading the first write data value and the first ECC value from the first address of the memory array;
generating a first corrected data and ECC value in response to the first write data value and the first ECC value retrieved from the memory array, wherein the first write data value and the first ECC value includes an error;
asserting an error indicator signal to indicate that the first write data value and the first ECC value includes an error;
storing the first corrected data and ECC value and the first address in a write-back buffer in response to the asserted error indicator signal; and
writing the first corrected data and ECC value to the first address of the memory array during an idle cycle of the memory device.

* * * * *

UNITED STATES PATENT AND TRADEMARK OFFICE
CERTIFICATE OF CORRECTION

PATENT NO. : 7,051,264 B2
APPLICATION NO. : 10/003602
DATED : May 23, 2006
INVENTOR(S) : Wingyu Leung et al.

Page 1 of 1

It is certified that error appears in the above-identified patent and that said Letters Patent is hereby corrected as shown below:

Column 1, line 15, replace "Semiconductors" with -- Semiconductor --.

Column 11, line 54, replace "sequencer," with -- sequencer 102 --.

Column 11, line 66, replace "doe" with -- does --.

Column 12, line 25, insert -- to -- after "Mwrite".

Column 12, line 54, delete "the" (first occurrence).

Column 16, Claim 3, line 7, replace "thy" with -- the --.

Signed and Sealed this

First Day of May, 2007

JON W. DUDAS
*Director of the United States Patent and Trademark Office*